United States Patent Office 3,536,727
Patented Oct. 27, 1970

---

3,536,727
α-(2-ARYLTHIAZOL-4-YL) LOWER FATTY ACIDS AND DERIVATIVES
John Frederick Cavalla, Isleworth, Middlesex, and Kevan Brown, Woodley, England, assignors, by mesne assignments, to John Wyeth & Brother Limited, Maidenhead, England, a British company
No Drawing. Filed Nov. 2, 1967, Ser. No. 679,976
Claims priority, application Great Britain, Dec. 22, 1966, 57,486/66; May 4, 1967, 20,699/67
Int. Cl. C07d 91/32
U.S. Cl. 260—302                        3 Claims

ABSTRACT OF THE DISCLOSURE

A group of 2-arylthiazol-4-ylaliphatic acids and esters and amides possessing useful anti-inflammatory activity is described; the aryl substituent may be furyl, thienyl, naphthyl, lower alkoxyphenyl or lower alkylphenyl.

---

This invention relates to 2-arylthiazoles, to processes for the preparation thereof and to pharmaceutical compositions containing such thiazoles.

The present invention provides 2-arylthiazoles of the general formula:

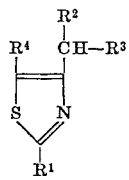

and acid addition salts thereof, and which $R^1$ is substituted or unsubstituted monocyclic heteroaryl radical or naphthyl radical, or is a phenyl radical substituted by one or more alkyl or alkoxy radicals, $R^2$ is a hydrogen atom or an alkyl radical containing up to 6 carbon atoms (such as a methyl radical), $R^3$ is a carboxyl radical, or a salt, ester, amide or hydroxamic acid thereof, and $R^4$ is a hydrogen atom or a methyl radical.

The compounds of the above general formula exhibit pharmacological activity, for example anti-inflammatory as shown by tests on laboratory animals, or are intermediates in the preparation of other substituted thiazoles.

Examples of tests which can indicate that a compound has anti-inflammatory activity are those described by Winter et al. in Nature, 179, 629 (1957), Konzett and Rosslear in Arch. Exp. Path. Pharmac., 195, 71 (1940), and Newbould, Brit. Journal Pharm. Chemoth, 21, 127–136 (1963).

A particular advantage of the anti-inflammatory compounds of this invention is that they tend to be relatively free of the undesirable side effects, e.g., ulcerogenic effects, which characterize many of the known anti-inflammatory compounds in present use.

The ring $R^1$ preferably is a phenyl ring substituted by one or more alkyl radicals containing up to 6 carbon atoms (e.g., methyl, ethyl, n-propyl, isopropyl or butyl) or alkoxy radicals containing up t o 6 carbon atoms (e.g., methoxy, ethoxy or propoxy). The radical

preferably is an acid (advantageously acetic acid) but may be an ester, salt, amide or hydroxamic acid derivative thereof.

The acids, salts and amides of the above general formula may be prepared by hydrolysis of the corresponding nitrile under the usual conditions known for the preparation of such acids, salts and amides, and if desired the acids or salts can be esterified. The nitrile may be prepared by reacting the corresponding halomethyl (e.g., chloromethyl or bromomethyl) compound with an alkali metal cyanide (e.g., sodium or potassium cyanide). The hydroxamic acid derivative can be prepared by reacting the ester with hydroxylamine.

The compounds of the above general formula, and the corresponding nitriles and haloalkyl compounds, can be prepared by suitable general methods known for forming an appropriately substituted thiazole ring.

Thus, an α-haloketone of the general formula:

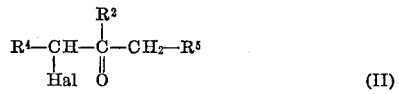

may be reacted with a thioamide of the general formula:

or

in which $R^1$, $R^2$ and $R^4$ have the meanings defined above, Hal is a halogen atom, for example chlorine or bromine and $R^5$ is —C≡N, a halogen atom or the radical $R^3$, and if necessary an after-reaction may be carried out to form the radical $R^3$.

When the compound of general Formula II is an ω-halo ketoacid ester (for example γ-bromoacetoacetic ester), the reaction is preferably carried out in solution in an alcohol (e.g., ethanol) to yield the desired product as the ethyl ester. When the compound of general Formula II has $R^5$ equal to a halogen atom (for example symmetrical dichloroacetone), the reaction may be carried out in acetone. Subsequent reaction with a cyanide (e.g., potassium cyanide) to yield the nitrile is then carried out. Hydrolysis of the nitrile yields the desired acid.

Alternatively, phosphorus pentasulphide may be used to cyclise an α-acylamino carbonyl compound of the general formula:

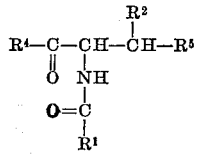

in which $R^1$, $R^2$, $R^4$ and $R^5$ have the meanings defined above, and if necessary $R^5$ can be converted to the desired radical $R^3$.

The cyclisation reactions outlined above generally may be carried out at room temperature or above, e.g., at temperatures of from 15° C. to the boiling point of the solvent used.

It is apparent that the radicals $R^1$, $R^2$, $R^3$ or $R^5$ and $R^4$ have to be inert under the reaction conditions so that appropriately substituted starting materials give the correspondingly substituted product but if necessary the radical $R^5$ can be then converted to that desired once the thiazole ring has been formed. When the radical $R^1$ is a heteroaryl radical it may for example be a 2- or 3-thienyl or furyl radical, and when it is a substituted phenyl radical preferred radicals $R^1$ are o-, m-, p-tolyl, and p-methoxyphenyl. It may also be a naphthyl, e.g., 1- or 2-naphthyl radical. The radical

preferably is an acetic acid radical, or a salt, ester, amide or hydroxamic acid derivative thereof but it may for example be the corresponding iso-propionic or iso-butyric derivatives. Of the possible esters, alkyl esters containing up to 4 carbon atoms in the alkyl group, particularly the ethyl esters are mentioned by way of example.

If the product obtained after forming the thiazole ring does not contain an aliphatic carboxylic acid group or a salt as

it can be converted thereto in known manner. For example, an ester, amide or nitrile group can be hydrolysed.

The 2-arylthiazoles provided by the invention contain a basic ring nitrogen atom capable of forming acid addition salts with pharmaceutically acceptable acids, and the invention also provides such salts.

The invention further provides a pharmaceutical composition which comprises a pharmaceutically active form of a compound provided by the invention and a non-toxic carrier. Advantageous pharmaceutically active forms generally are those when $R^3$ is a carboxyl group which may be in salt form (e.g., as an alkali metal salt, particularly sodium and potassium salts).

The pharmaceutically acceptable carrier of the composition of the invention can be a solid or a sterile liquid. Solid form compositions include powders, tablets and capsules. A solid carrier can be one or more substances which may also act as flavouring agents, lubricants, solubilizers, suspending agents, binders or tablet-disintegrating agents; it can also be an encapsulating material. In powders the carrier is a finely divided solid which is in admixture with the finely divided active ingredient. In tablets the active ingredient is mixed with a carrier having the necessary binding properties in suitable proportions and compacted in the shape and size desired. The powders and tablets preferably contain from 5 to 99, preferably 10–80% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, and cocoa butter. The term "composition" is intended to include the formulation of an active ingredient with encapsulating material as carrier to give a capsule in which the active ingredient (with or without other carriers) is surrounded by carrier, which is thus in association with it. Similarly cachets are included.

Sterile liquid form compositions include sterile solutions, suspensions, emulsions, syrups and elixirs. The active ingredient can be dissolved or suspended in a pharmaceutically acceptable sterile liquid carrier, such as water or a sterile organic solvent or a mixture of both. Preferably a liquid carrier is one suitable for parenteral injection. Where the active ingredient is sufficiently soluble it can be dissolved in normal saline as a carrier: if it is too insoluble for this it can often be dissolved in a suitable organic solvent, for instance aqueous propylene glycol or polyethylene glycol solutions. Aqueous propylene glycol containing from 10 to 75% of the glycol by weight is generally suitable. In other instances compositions can be made by dispersing the finely divided active ingredient in aqueous starch or sodium carboxymethyl cellulose solution, or in a suitable oil, for instance arachis oil. Liquid pharaceutical compositions which are sterile solutions or suspensions can be utilized by intramuscular, intraperitoneal or subcutaneous injection. In many instances a compound is orally active and can be administered orally either in liquid or solid composition form. The pharmacologically active compounds of this invention may also be incorporated into creams or ointments for topical application.

The following non-limiting examples illustrate the invention.

EXAMPLE 1

2-p-methoxyphenyl thiazol-4-ylacetic acid

Sym.-dichloracetone (1.52 g.) and p-methoxythiobenzamide (2.0 g.) were allowed to react in acetone (10 ml.) at room temperature overnight. The mixture was filtered, and the crystalline solid (2.83 g.) obtained was heated in a refluxing solution of hydrochloric acid (2 ml.) in acetone (50 ml.) until a clear solution was formed after about 4 hours. On cooling, crystals of a hydrochloride salt formed, and were filtered off and added to a solution of sodium carbonate. Extraction with ether and subsequent washing, drying and evaporation of the ether extract gave 4-chloromethyl-2-p-methoxyphenylthiazole (1.9 g.) as an oil. This oil was heated on a steam bath with potassium cyanide (1 g.) in ethanol (30 ml.) and water (10 ml.) for 4 hours. Most of the ethanol was then evaporated, water was added and the cyano compound was extracted with ether. The ether extract was washed with water, dried over $Na_2SO_4$ and evaporated to give a solid (2.0 g.) which was recrystallized from aqueous ethanol to yield 4-cyanomethyl-2-p-methoxyphenylthiazole (0.9 g.), M.P. 73° C. The cyano compound was heated for 1½ hours in refluxing 6 N hydrochloric acid (10 ml.) and then the solution was cooled, the pH adjusted to about 4 with alkali, and extracted with ether. The ether extract was washed with water, dried over $Na_2SO_4$ and evaporated to give 2 - p-methoxyphenylthiazol-4-ylacetic acid (0.74 g., 25%), M.P. 108–109° C. (from benzene-hexane).

EXAMPLE 2

2-(1'-naphthyl)thiazol-4-ylacetic acid

Sym.-dichloroacetone (11.5 g.) and 1 - thionaphthoicamide (17 g.) were dissolved separately in the minimum quantity of acetone, and then the solutions were mixed and left at room temperature overnight. The crystalline product (believed to be 4-hydroxy-4-chloromethyl-2-naphthyl-$\Delta^2$-thiazoline) was filtered off, washed with acetone and dried.

This product was dissolved in methanol (500 ml.) and boiled under reflux for 2 hours. Most of the solvent was removed (rotary evaporator), and then aqueous sodium hydrogen carbonate was added. The white precipitated solid was filtered off, washed with water, and dried to give 4-chloromethyl-2-(1'-naphthyl)thiazole (20.4 g.).

The chloromethylthiazole (20.4 g.) was heated on a steam bath with potassium cyanide (10.0 g.) ethanol (60 ml.) and water (20 ml.) for 4 hours. The mixture was evaporated to near dryness and poured into excess water. The resulting oil was extracted into ether, washed well with water, then with saturated sodium chloride and evaporated to give the nitrile (19.7 g.).

The crude nitrile (19.7 g.) was suspended in 6 N hydrochloric acid (200 ml.) and boiled under reflux for 1½ hours. On cooling, the crystals which had formed were filtered off, washed once with water and dissolved in 2 N sodium hydroxide solution. The solution was treated with charcoal, filtered, and the filtrate acidified to pH 4 with concentrated hydrochloric acid. The oil formed was extracted into ether, dried ($MgSO_4$) and evaporated to give a crystalline solid which was recrystallised from benzene/petrol (60–80° C.) to give crystals of 2-(1'-naphthyl)thiazol-4-ylacetic acid, M.P. 153–4° C. Yield: 12.4 g. (73%).

*Analysis.*—Found (percent): C, 66.9; H, 4.05; N, 5.2; S, 11.8. $C_{15}H_{11}NO_2S$ requires (percent): C, 66.8; H, 4.1; N, 5.2; S, 11.9.

EXAMPLE 3

2-(o-tolyl)thiazol-4-ylacetic acid

The procedure of Example 2 was repeated but using 12.7 g. of symmetrical dichloroacetone, and 15.1 g. of o-methylthiobenzamide to obtain 14.6 g. of the chloromethyl compound. All of this compound was reacted with 8 g. of potassium cyanide in the presence of 30 ml. of ethanol and 10 ml. of water to yield the nitrile which was treated in accordance with Example 2 with 100 ml. of 6 N hydrochloric acid to yield 10.1 g. of the desired product (67%), M.P. 119–120° C.

*Analysis.*—Found (percent): C, 61.6; H, 4.8; N, 6.2; S, 13.6. $C_{12}H_{11}NO_2S$ requires (percent): C, 61.8; H, 4.7; N, 6.0; S, 13.7.

EXAMPLE 4

2-(m-tolyl)thiazol-4-ylacetic acid

The procedure of Example 2 was repeated but using 15.1 g. of m-methylthiobenzamide and 12.7 g. of symmetrical dichloroacetone to yield 11.5 g. of the chloromethyl compound. The experiment was repeated to give a total of 14.4 g. of the chloromethyl compound which was then reacted with potassium cyanide (8 g.) in the presence of ethanol (30 ml.) and water (10 ml.) to yield the nitrile which was hydrolysed with 100 ml. of hydrochloric acid to yield 12.6 g. of the desired product (84%), M.P. 110–111° C.

*Analysis.*—Found (percent): C, 61.6; H, 4.8; N, 6.2; S, 13.6. $C_{12}H_{11}NO_2S$ requires (percent): C, 61.8; H, 4.7; N, 6.0; S, 13.7.

EXAMPLE 5

2-(p-tolyl)thiazol-4-ylacetic acid

The procedure of Example 2 was followed but using 13.5 g. of p-methylthiobenzamide and 11.4 g. of symmetrical dichloroacetone to yield 16.0 g. of the chloromethyl compound. All of this compound was then reacted with potassium cyanide (8 g.) in the presence of ethanol (50 ml.) and water (10 ml.) to yield the nitrile. Hydrolysis of the nitrile with 100 ml. of 6 N hydrochloric acid yielded 11.4 g. of the desired product (68%), M.P. 139–140° C.

*Analysis.*—Found (percent): C, 61.7; H, 4.9; N, 5.9; S, 13.5. $C_{12}H_{11}NO_2S$ requires (percent): C, 61.8; H, 4.7; N, 6.0; S, 13.7.

EXAMPLE 6

2-(2'-naphthyl)thiazol-4-ylacetic acid

The procedure of Example 2 was followed but using 18.7 g. of 2-thionaphthoic amide and 12.7 g. of symmetrical dichloroacetone to yield 19.2 g. of the chloromethyl compound. 13.0 grams of this intermediate were reacted with potassium cyanide (6.5 g.) in the presence of ethanol (60 ml.) and water (20 ml.) to yield the nitrile. The nitrile was hydrolysed with 200 ml. of 6 N hydrochloric acid to yield 9.4 g. of the desired compound (70%), M.P. 140–141° C.

*Analysis.*—Found (percent): C, 66.9; H, 4.1; N, 5.1; S, 11.8. $C_{15}H_{11}NO_2S$ requires (percent): C, 66.8; H, 4.1; N, 5.2; S, 11.8.

Examples of other compounds which can be prepared following the information given herein include 4-methyl-2-(o-tolyl)thiazol-4-ylacetic acid, 2-(m-tolyl)thiazol-4-yl acetamide, 2-(m-tolyl)thiazol-4-ylacetic acid ethyl ester, α-[2-(2'-thienyl)thiazol-4-yl]propionic acid, α-[2-(2'-thienyl)thiazol-4-yl]propionamide, α-[2-(2'-thienyl)-thiazol-4-yl]propionic acid methyl ester and 2-(2'-furyl)-thiazol-4-ylacetic acid.

What is claimed is:

1. A compound having the formula:

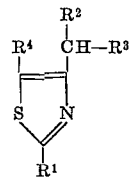

in which $R^1$ is an aryl radical selected from the group consisting of furyl, thienyl, and naphthyl, $R^2$ and $R^4$ are selected from the group consisting of hydrogen atoms and lower alkyl radicals and $R^3$ is selected from the group consisting of carboxyl radicals and amides and lower alkyl esters thereof.

2. 2-(1'-naphthyl)thiazol-4-ylacetic acid.
3. 2-(2'-naphthyl)thiazol-4-ylacetic acid.

References Cited

Hinegardner et al.: Chem. Abstracts (1930), 24:5751.
Huntress et al.: Chem. Abstracts (1943), 37:6263–4.

ALEX MAZEL, Primary Examiner

R. J. GALLAGHER, Assistant Examiner

U.S. Cl. X.R.

260—306.7, 567; 424—270